(12) United States Patent
Ludwig

(10) Patent No.: US 6,820,660 B1
(45) Date of Patent: Nov. 23, 2004

(54) DEVICE FOR THE STERILE FILLING OF BOTTLE SHAPED CONTAINERS

(75) Inventor: Werner Ludwig, Darmstadt-Wix-hausen (DE)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 10/450,225
(22) PCT Filed: Dec. 14, 2001
(86) PCT No.: PCT/EP01/14745
  § 371 (c)(1),
  (2), (4) Date: Jun. 11, 2003
(87) PCT Pub. No.: WO02/053487
  PCT Pub. Date: Jul. 11, 2002

(30) Foreign Application Priority Data

Dec. 28, 2000 (DE) .......................... 100 65 591

(51) Int. Cl.[7] .............................................. B65B 1/04
(52) U.S. Cl. ............................ 141/89; 141/48; 141/129
(58) Field of Search ...................... 141/48, 63, 89–93, 141/97, 129, 172, 275–278

(56) References Cited

U.S. PATENT DOCUMENTS

| 3,783,581 A | 1/1974 | Pierce | 53/37 |
| 3,859,774 A | 1/1975 | Bausch | 53/167 |
| 4,014,158 A | 3/1977 | Rausing | 53/167 |
| 4,707,334 A | 11/1987 | Gerhard | 422/28 |
| 6,209,591 B1 * | 4/2001 | Taggart | 141/89 |

FOREIGN PATENT DOCUMENTS

| DE | 38 14 650 C1 | 4/1988 | |
| DE | 44 08 301 A1 | 3/1994 | A61L/2/14 |
| DE | 198 17 735 C 1 | 4/1998 | B67C/3/10 |
| DE | 299 23 443 U 1 | 9/1999 | A61L/2/18 |
| WO | WO 00/45862 | 8/2000 | A61L/2/16 |

* cited by examiner

Primary Examiner—Gregory L. Huson
Assistant Examiner—Peter deVore
(74) Attorney, Agent, or Firm—Howard M. Ellis

(57) ABSTRACT

A device for filling bottles with liquid foodstuff in sterile conditions wherein an intermittently driven device is provided with bottle supports arranged successively in a line in the direction of conveyance and which passes through processing stations. The device is arranged in a hygienic chamber having through openings for the containers of the inlet and outlet thereof, including at least one inlet for introducing sterilizing medium in the upper wall of the hygienic chamber. Contiguous bottle supports form a closed area within the upper wall of the hygienic chamber and gas extraction systems are disposed in the vicinity of the bottle openings and on the outside of the hygienic chamber perform as dynamic sluice elements. The growth conditions for microorganisms in the hygienic chamber are hindered even in the event the amount of sterilizing agent is reduced.

18 Claims, 5 Drawing Sheets

DEVICE FOR THE STERILE FILLING OF BOTTLE SHAPED CONTAINERS

CROSS REFERENCE TO RELATED APPLICATIONS

This application claims priority under International Application PCT/EP01/14745, filed 14 Dec. 2001, which claims priority from German Application DE 100 65 591.2, filed 28 Dec. 2000.

TECHNICAL FIELD

This invention relates to a device for the sterile filling of bottle-shaped containers with liquid foodstuffs, for example, drinks in which an intermittently driven conveyor in a line in the conveyance direction (first direction of movement), has container carriers arranged one behind the other which can be moved through processing stations, and is arranged in a hygiene chamber provided with openings for the containers to pass through at the entrance and exit, and with at least one inlet for sterilizing medium.

BACKGROUND OF THE INVENTION

For the manufacture and in particular the completion of containers, in the case of known machines, the containers are held in work-piece carriers, and by means of continuously circulating conveyor belts, intermittently conveyed to individual processing stations wherein the respective container, for example, after unfolding is completed, filled and finally sealed. The conveyor belts run around two guide rollers in which the work-piece carriers in their conveyor arcs are turned from a vertical alignment into a horizontal, and then again into a vertical alignment. The vertical alignment is for the process level because such conveyors are frequently used in the packaging of liquid foods which are filled from above into the container open at the top, standing underneath. In many conveyors the work-piece carriers are rigidly concatenated, for example, via roller or link chains. If such conveyors are to be used in the foodstuffs sector, sterile packaging is often necessary, and in the case of roller or link chains, moving parts have to be lubricated, with the result that such conveyors cannot operate in a hygienic clean room where the filling of the containers takes place.

In order to increase the mechanical output of packaging machinery, and in particular of filling, i.e., in order to be able to process a larger number of containers per unit of time in a machine, along the process level several container carriers have been arranged next to each other, which are therefore arranged at right angles to the first direction of movement. Insofar as continuous conveyors of such a kind can be used at all for multiplication in the width, the width of such a process level is however at least for static reasons subject to limits which do not allow a further increase in output.

Similarly to continuous conveyors, according to the invention the containers are also intermittently conveyed back in a first direction of movement (conveyance direction) in container carriers on a first process level in positions below various processing stations, and on a second return level in a second direction of movement, parallel to the first direction of movement, forming a conveyance circuit.

Schematically, the conveyance circuit runs according to a loop or a rectangle when the conveyor is viewed from the side. There are open filling systems without hygiene chambers with measures for sterilization of the filling product and the inside of the container, including the neck of the bottle in the case of bottle-like containers. There are also closed conveyance systems which have conveyors in a closed hygiene room.

In the known machines described above, with conveyor belts and work-piece carriers held on these, in which the respective container is conveyed under the processing stations, the work-piece carriers act as blades so that containers introduced from bacteria-contaminated ambient air are conveyed onwards, at least partially, on the outside also with the bacteria-contaminated air in a clean room, or else bacteria-contaminated air outside and inside the containers are conveyed under the sterilized processing stations. Therefore, bacteria are disadvantageously conveyed from outside to positions where the air volume is actually meant to be sterile. This disadvantage has been partly recognized, and attempts have been made to remedy it, by immediately re-extracting the air which partially and possibly contains bacteria. However, with this air is also extracted sterilizing medium which is later missing during sterilization. This could only be compensated for by adding very large streams of sterilizing medium.

A person skilled in the art therefore would not know how the entry of bacteria-contaminated air could be avoided with the known devices, and on the other hand, how the growth conditions, in particular in closed systems with hygiene chambers, are to be reduced, so that, for example, bacteria introduced do not grow, or spread less vigorously. A person skilled in the art would pump sterile air or a sterilizing medium in the form of sterile air and sterilization agent, e.g. $H_2O_2$, into the hygiene room, and continuously maintain therein an excess pressure of this sterilizing medium vis-a-vis the environment. However, this would have the disadvantage not only of consuming a very large amount of sterilizing medium and energy for the sterile air, but the environment would also be heavily charged with hydrogen peroxide, with all the health risks.

SUMMARY OF THE INVENTION

The object of the invention is therefore to create a device of the type initially mentioned, in which the growth conditions for microorganisms, bacteria and spores are reduced in a hygiene chamber and the preconditions for contamination already in the hygiene chamber are reduced despite the use of small quantities of sterilization agent.

This object is achieved by means for the adjacent movement of the container carriers in the region of the upper side of the conveyor, such that the container carriers form a predominantly closed field, which is arranged under formation of an upper space at a distance below the upper wall of the hygiene chamber. Further, through an inlet for the sterilizing medium produced in the upper wall of the hygiene chamber, means are provided for the forcing of the sterilizing medium, under excess pressure, into the upper space of the hygiene chamber, and moreover, by means for the conveyance of the sterilizing medium essentially parallel to the conveyance direction (first direction of movement) of the container carriers, gaps are provided at the ends of the closed carrier field, next to the end-surfaces of the hygiene chamber in order to guide the sterilizing medium out of the upper space and through the openings for containers to pass through, formed as dynamic locks into gas extraction devices provided next to the latter and outside the hygiene chamber. The whole conveyance system according to the invention is therefore constructed such that one container carrier is in contact with the next, and several container carriers in the region of the upper surface of the conveyor form a complete surface or a field. This field represents a type of wall, even if it has holes and gaps. This wall forms the lower partition of an "upper space" which lies between the upper wall of the hygiene chamber and precisely this closed field. This upper space above the closed field formed by the container carrier can even be open in front and behind at the field. Nevertheless, it is possible to imagine the upper space limited at the sides, above and below, in the upper region of the hygiene chamber. If in the upper wall of the hygiene chamber, i.e. above the upper space, at least one inlet is produced for the sterilizing medium, then this upper space can be filled with sterilizing medium via the at least one inlet as desired. This is achieved particularly favorably by means, for example, impeller wheels, fans, pumps, for the forcing of the sterilizing medium, under excess pressure, into the upper space of the hygiene chamber. If for example fresh or highly concentrated sterilizing medium enters the upper space of the hygiene chamber through the upper wall, then this stream of sterilizing medium can be directed and optionally also introduced at different speeds by means of different pressures. The container carriers can be constructed, or provided with additions constructed in such a way that they form means for the guiding of the sterilizing medium essentially parallel to the conveyance direction (the first direction of movement) of the container carriers. This concept involves the streaming of the sterilizing medium, which is generally in gaseous or also mist form, in the conveyance direction of the container carriers and against this conveyance direction; in both cases parallel to the conveyor.

The upper space in the hygiene chamber is more or less closed and is open at its entry end as also at its exit end (in each case seen in the conveyance direction) of the closed carrier field. In particular the upper space next to the end-surfaces of the hygiene chamber is open in the region of the ends of the closed carrier field because of gaps. These gaps offer means for the guiding of the sterilizing medium out of the upper space into other regions within the hygiene chamber, in which the pressure is lower, for example where the sterilizing medium is extracted. To simplify the device according to the invention, the bottle-shaped containers to be filled enter the hygiene chamber from outside through openings in partitions of the hygiene chamber. It is especially favorable if these openings for containers to pass through are constructed as dynamic locks. These are not standard locks with separate spaces in which different atmospheres can be produced charge-wise, and which are then opened to one or other side. Rather, the dynamic lock according to the invention is a space next to the openings for containers to pass through, where, due to the entry of the containers from outside together with partially bacteria-contaminated air, this bacteria-contaminated air is extracted, replaced by sterile air from the hygiene chamber, or mixed with the latter and also extracted. In the region around the containers delivered to the hygiene room, there is a space with relatively active gas exchange under continuous extraction of these gases, until after a minimum time the gases around the containers essentially have a concentration of sterilization medium, such as at least the spaces in the hygiene chamber with low concentration. During or after the exchange of the container content, i.e. the outflow of the still contaminated air and inflow of sterile gases, the containers leave the dynamic locks and then pass into spaces at a somewhat greater distance from the gas extraction devices. The gas extraction devices in the form of fans, impeller wheels, pumps or the like are provided next to the openings for containers to pass through and partially outside the hygiene chamber.

The advantage of these gas extractions is that, on the one hand, only a small quantity of sterile air is lost to the circuit, and on the other hand, these sterile gases do not simultaneously contaminate the ambient air. Advantageously, less sterilization agent is required. Nevertheless, the growth conditions for microorganisms are reduced throughout the hygiene chamber. The mentioned measures of the new device allow the entry of only small quantities of microorganism-contaminated air into the hygiene space. The inlets for the sterilizing medium in the upper wall of the hygiene chamber can be constructed and operated in such a way that a large quantity of sterile air with sterilization agent is blown in, but is simultaneously recovered by gas extraction devices and retained in the circuit. The containers to be filled must be introduced into the hygiene chamber before filling, and guided out afterwards. In both cases the containers pass through their openings. Therefore, next to the openings for containers to pass through on the entry side and also on the exit side, there are provided the gas extraction devices, for example, outlet-like, funnel-shaped suction lines into which the external air introduced with the containers is also partly extracted. After leaving the dynamic locks, only the volumes of the respective contents of the bottles represent carriers of contamination, as contaminated air has been extracted from outside. In the case of a well-functioning machine, the bottle-shaped containers are in direct contact with the sterilization medium for approximately 24 seconds, resulting in a considerable reduction in the number of microorganisms.

It is preferable for the bottle-shaped containers, hereafter shortened to "bottles', to be held with their opening towards the top, and transported in such a way that the open side of the bottle in each case faces the upper wall with the inlets for the sterilizing medium. The essentially gaseous sterilizing medium is then preferably blown into the bottles, so that the exchange of the microorganism-contaminated air from the inside of the bottle is already quickly completed, but at the latest in the region of the treatment stations, where sterilization medium is sprayed in and dried out. However, this process and the device according to the invention can also be used in the case of closed bottles or other containers. The reduction of microorganisms is all the more intensive the less a bottle has to be sterilized inside, if for example, bottles are sterile inside due to the production process and are kept closed, and only sterilized from outside and then opened shortly before filling. It is expedient for the sterile air to be heated above 70° C. and hydrogen peroxide ($H_2O_2$) in gaseous form to be sprayed in as sterilization agent at a temperature which lies slightly below the condensation temperature. In the upper wall of the hygiene chamber, along the closed field, a large number of inlets for the sterilizing medium are preferably arranged in rows one behind the other, wherein preferably, according to the invention, the inlet for the sterilizing medium has a plurality of openings produced at a distance from one another in the upper wall of the hygiene chamber. If these openings, in the case of a further version of the invention, are connected to valve-controlled delivery lines, then one or other opening can be closed or opened further by the valves in the individual delivery lines, in order to achieve a specific flow pattern of the sterilizing medium in the hygiene chamber and to change this. The many openings in the upper wall of the hygiene chamber can be arranged more or less spread out. The concentration of the openings can preferably be greatest in the region after the spraying-in of the sterilizing medium (preferably in gaseous form) and during the first drying. Then the sterilizing medium can be introduced there at the maximum temperature and then blown further in or against the conveyance direction.

In the device according to the invention, the whole space in the hygiene chamber can be made sterile from the start of operation, so that the basic load of the air in the hygiene chamber with respect to bacteria and other microorganisms is already reduced. Using the measures according to the invention, it is possible to continue keeping the atmosphere in the hygiene chamber sterile, with only little use of material. Sterilizing medium is introduced continuously or in a controlled manner through the inlets in the upper wall of the hygiene chamber, while more or less sterile air, and also microorganism-contaminated air is extracted simultaneously at the inlets and outlets for the containers, and optionally, also through other openings. Scarcely, one contaminating layer with many microorganisms will therefore remain or form on the surface of the respective container. In the dynamic lock a kind of pre-sterilization of the bottle is carried out by the extracted air flows. Contaminated air from the inside of the bottle also preferably still enters the region of the dynamic locks at the extraction points, and advantageously, cannot get into other more critical regions, in particular into the filling region.

Defined flow conditions and flow directions of the sterile air can be achieved using the measures according to the invention. The risk of recontamination of a treated bottle or other container is considerably reduced.

With simple means, the air can be subjected to a specific flow pattern. By arranging the closed field of the container carriers in the upper region of the hygiene chamber, a relatively shallow upper space can be formed, with the consequence that the sterile air/the sterilizing medium essentially flows to the two open ends of the closed field and from there from the "process level' downwards into the main space of the hygiene chamber. As sterilization agent is preferably only conveyed from above, the concentration of sterilization agent in the sterile air in the hygiene chamber diminishes downwards. A volume of highest concentration can be produced above the process level in the upper space, and of high concentration at the ends of the closed field of the container carrier, and further downwards, of average/low concentration of sterilization agent.

The container carriers can preferably have the form of pallets which can also be called carrier pallets. The conveyor creates a movement of the container carriers along a closed route, which can have the form either of a loop or the form of a rectangle or other quadrangle. This closed, mechanical carrier circuit continuously passes through the different regions of concentration within the hygiene chamber.

According to the invention, it is expedient for processing stations in the upper space of the hygiene chamber to be arranged below its upper wall. The row of processing stations arranged behind one another in the conveyance direction is located at the height of the "first process level", the conveyor also essentially running horizontally at this process level, as also in the second return level arranged under it. Vertically operating second and fourth lifting conveyors are connected in between. Each conveyor preferably has a separate drive. In a further version of the invention, a further third loading level is located horizontally between the upper first process level and the lower second return level. All three levels are essentially arranged horizontally.

In an advantageous version of the invention, each container carrier has an essentially flat construction and is held above the conveyance circuit in an essentially horizontal position. In the region of the third, middle loading level, means for loading and unloading the containers into and/or out of the container carriers are provided in a loading direction, which is parallel to the first direction of movement (the conveyance direction) of the containers.

If a simplified conveyor configuration is imagined with the already mentioned rectangular conveyance route and a clock-wise movement, then the container carriers are moved in the first process level (for example starting on the left), from left to right by the first conveyor, at the end lowered vertically by the second lifting conveyor downwards into the second return level, there returned horizontally to the left by the third conveyor, so that the fourth lifting conveyor then lifts the container carriers vertically back into the starting position, upwards into the first process level.

The compact construction of the conveyor experiences no restriction at all if the middle, third loading level is provided between the upper first process level and the lower second return level. By arranging this loading level, however, the output of the conveyor can be considerably increased, in that the loading and unloading can be carried out surprisingly rapidly. The loading and unloading means can remove completed containers from the container carriers with considerable acceleration over a short distance, and on the other hand push empty containers into the container carriers at the loading position. This can be carried out simultaneously for a plurality of containers, providing that the container carriers can hold several containers.

Again looking at the simple conveyor configuration with the upper space above the closed field of the container carriers and the main space of the hygiene chamber situated below it, it is then expedient for the dynamic lock to be arranged under the inlet and outlet end of the closed field of the container carriers both for the introduction of the bottle-shaped containers (bottles) and for their removal. If the containers, for example, run from the left at the entrance end to the right where they are removed at the exit end, then the dynamic lock for the supply of containers is arranged approximately in the middle between the upper level of the closed field of the container carriers and the return conveyor below. At the exit end, its behavior corresponds to that of the dynamic removal lock. In both cases, it is thereby possible to convey a bottle carrier vertically directly from the loading level into the upper process level and from there to transfer it into the horizontal conveyor, which intermittently advances the respective container carrier in the conveyance direction, one step at a time. At the end of the process level, the closed containers are still in the container carrier, which however is removed from the process level and lowered into the loading level, where it is received and held in the dynamic removal lock. There, in a similar manner as with filling and supplying similar unloading means, in each case a row of containers is unloaded simultaneously from the container carrier. The empty container carrier can then be vertically lowered onto the lower return level, so there it can be moved to the left under the dynamic supply lock. From there the container carrier is lifted into the supply lock.

It is favorable if the container carrier, on two diametrically opposite sides, has U-shaped recesses that are open outwards and are aligned in the first direction of movement of the first conveyor. A vertical axis can be imagined in the center of a U. If a further U, inversely aligned, is arranged at a distance below this U, such that both central axes fall on one line, this gives the above-described alignment of the two recesses. In addition, the invention subsequently provides the teaching that this central line of the two U-shaped recesses arranged opposite to one another is parallel to the first direction of movement. The alignment of these recesses has a particularly favorable effect in the third loading level during loading and unloading. During unloading, the one container is pushed or pulled out of the recess which is open towards the outside in the conveyance direction. This direction of movement is, for example, the same as the first direction of movement. The other opposite container is then moved out in the opposite direction. Both these operations take place simultaneously and require only a little time. The other advantage of the two recesses is that the container carrier in this way doubles its capacity. A person skilled in the art knows that the width of a machine and also of a conveyor cannot be increased at will because strength conditions place a limit on the widening of a container carrier. By arranging two recesses which are aligned with one another, it is possible to hold, transport, load and unload two containers instead of one on this track.

According to the invention, it is also favorable for the container carrier to have the form of an elongated strip extending at right angles to the first direction of movement, such that the recesses lie next to each other in pairs. Apart from the abovementioned doubling of capacity of a container carrier from one to two containers, the extension of capacity in the transverse direction is possible to a certain extent as allowed by the strength conditions. For this purpose, the container carrier can be constructed in strip or rod form, and the recesses arranged next to each other in pairs. The loading and unloading devices which operate in the third loading level can then simultaneously move all the containers, arranged next to each in a strip, outwards or inwards. The capacity of such a conveyor is considerably increased as a result.

According to the invention, it is also advantageous if the container carrier for holding the bottles is a strip-shaped sheet with pairs of U-shaped recesses facing away from each other, arranged next to each other at right angles to the first direction of movement, the width of the U-shaped recesses corresponding to the external diameter of the neck of the bottle. A favorable field of use of the conveyor according to this invention is the receiving, holding and transport of bottles open at the top, preferably made from plastic. The width of the respective U-shaped recess then corresponds approximately to the external diameter of the relevant neck of a bottle. It is self-evident that it is only necessary to push a bottle from outside into the base of the U, in order to provide a good hold for the bottle there. Conversely, unloading is just as favorable. The production of such a container carrier is economical and technically surprisingly simple. A correspondingly constructed sheet or a strip with double walls and stiffening rails can be produced simply, and apart from cleaning, requires no maintenance whatsoever. Such a container carrier can be inserted into the devices described above and be transported via the different conveyor routes. Carriers, connecting pieces and rails attached to these can be provided at the narrow ends of a preferred strip-shaped sheet, so that the container carriers are moved along the first process level and also along the second return level with simple means and preferably sliding on bearing rails.

According to the invention, it is particularly advantageous if means are provided for the feeding of sterile, gaseous nitrogen into the respective container during filling of almost the whole volume of the container with nitrogen, preferably before filling of the container with the product (liquid foodstuff). It is favorable if the nitrogen is introduced at approximately 20° C. This nitrogen has a microorganism-reducing effect or is microorganism-free, especially if nitrogen gas is fed through a sterile filter, and rinses the respective container whose volume will be almost completely filled with nitrogen, three times with the volume of the container. It has been shown that in the case of filling with fruit juices, the storage time can be considerably increased using this measure. Due to the above measures, the liquid nitrogen, which is non-sterile when it leaves the factory, does not need to be sterilized with heat beforehand.

During the introduction of nitrogen into the entire volume of the container before filling with liquid foodstuff, liquid nitrogen can, however, also be introduced into the head space above the food filling the container. The nitrogen then boils and gives the head space in the bottle a slight excess pressure, which can sometimes be desirable.

As a treatment station, there are the stations for preheating, sterilizing, for example, spraying, and optionally repeated drying, filling and sealing. Considerable variation can be used here. For example, by installing several preheating stations, by providing several drying stations, or else by providing processing stations to feed aromatics or to feed orange pieces, if fruit juices are being packaged. All these variations and changes in the number and type of processing stations in the upper space of the hygiene chamber have no influence on the remaining measures of sterilizing, and maintaining sterility.

As a sterilizing medium, according to the invention sterile air and a sterilization agent, for example, hydrogen peroxide, are preferably used as a mixture. In order to make the air sterile, it is pre-filtered and then heated to a temperature above 380° C. This sterile air can preferably be introduced via approximately 70 to 90% of the inlet openings for the sterilizing medium in the upper wall of the hygiene chamber. The sterilization agent is introduced through the remaining inlets. The latter preferably takes place in the front region (with respect to the conveyance direction) of the upper space after the preheating of the bottle-shaped containers conveyed. The bottles can be held by the container carriers in such a way that only the necks of the bottles, and the openings in the case of bottles open at the top, project above the closed field of the container carriers into the upper space. After preheating of the bottles held in this way, the sterilization agent plus sterile air is supplied, for example, at the first spraying station or the first sterilizing station, whilst subsequently only sterile air is again introduced through the inlets in the upper wall of the hygiene chamber.

The openings for extracting the more or less strongly sterile gases are located in a partition of the hygiene chamber. The gas extraction devices extend like roof-shaped funnels above tunnel-like spaces, which are in each case filled by a row of bottles to be treated or bottles already treated. From these spaces in the dynamic lock, the containers are then simultaneously pushed into the container carriers in the described manner. This takes place in a very short time over a very short route, with the result that the loading of the container carrier takes place quickly and without problems. The same also applies to the removal tunnels, although fewer microorganisms are extracted there with the gases surrounding the bottles.

A further advantage of the U-shaped recesses in the container carrier with the widths matched to the necks of the bottles is that bottle bodies of a different format are received and can be transported by the same container carrier, provided that only the external measurements of the neck of the bottle are identical. In the case of many bottles of a different format, the neck measurements are standardized and have a solid structure.

In contrast to the state of the art, the container carriers according to the invention are not rigidly concatenated with one another, so that they can be flexibly staggered. For example, almost all the container carriers can be conveyed into the first process level, and the device cleaned at the other partial conveyor, or almost all the container carriers can be conveyed into the second return level, in order to clean the individual processing stations from all sides. Sections of the whole conveyor according to the invention can therefore be run empty. Due to the practical and simple holding of the container carriers on the bearing rails, it is possible to exchange these in a very short time, and with very simple tools. This may possibly be necessary, for example, during the exchange of bottles or formats.

In a preferred embodiment, the loading of the container carriers on both sides from the front and from the rear allows the containers on both sides to be loaded rapidly and in a space-saving manner.

BRIEF DESCRIPTION OF THE DRAWINGS

Further advantages, features and possible uses of the present invention are made clear with reference to the following description of preferred embodiments in conjunction with the attached drawings. There are shown in.

DESCRIPTION OF THE PREFERRED EMBODIMENTS

Figure 1:
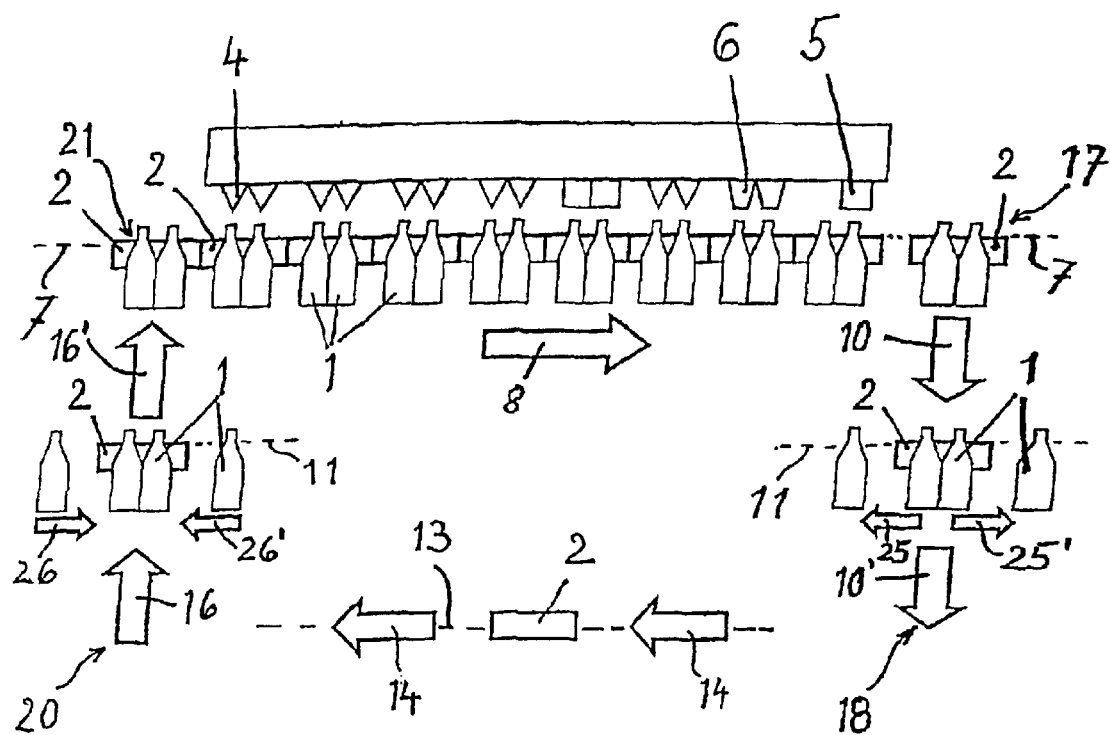
FIG. 1 a schematic drawing of the whole conveyance circuit for the sterile filling of bottles, representing three levels and four conveyors, FIG. 2 an isometric overall view of the conveyor, FIG. 3 a similar schematic view of the device according to the invention for the sterile filling of bottles, in which here the conveyance circuit is largely omitted and only reproduced schematically simplified, however with representation of the hygiene chamber, the upper space and the gas streams represented by means of arrows, FIG. 4 a similar view to FIG. 3 wherein, instead of the stream arrows, the various spaces in the hygiene chamber, in which different concentrations of sterilization agent are formed, are represented by shades of grey, and FIG. 5 an isometric oblique top view of the container carrier with plastic bottles inserted as containers.

In the embodiment shown here, the containers designated 1 are plastic bottles, and the bottle-shaped containers 1 in the following description of the preferred embodiments are designated "bottle". The bottles sit in container carriers 2. Under a frame, which at the same time also forms the upper limitation of a hygiene chamber 3, various processing stations, 4, 5, 6 are installed from left to right, for example, blast nozzles for preheating, then spray nozzles in the case of the spraying-in a sterilizing mixture as sterilizing medium, then various drying stations, cutting station, a filling station 6 and the sealing station 5, by means of which the filled bottles are sealed. In a preferred embodiment for containers of liquid food, sealing can be carried out, for example, by sealing with a plastic-coated aluminium film. It is recognized that both the processing stations 4 and 6 are formed double, i.e., two rows of bottles are always processed simultaneously, for example, filled in the filling station 6, whereas the sealing station 5 with the relatively expensive sealing tools is formed only singly/in one row.

The row of container carriers 2 under the processing stations 4 to 6 is located in the first process level 7, wherein the container carriers 2 and with it the bottles 1 are moved in the first direction of movement represented in FIG. 1 by the arrow 8, i.e. from left to right in FIG. 1.

When the bottles 1 have reached the right-hand outlet end in the first process level 7, i.e., they are filled and sealed, the container carrier concerned is changed over to the second vertically-operating lifting conveyor, generally designated 9 (FIG. 2), in this, the container carrier 2 is lowered corresponding to the arrows 10 and 10' (vertical second direction of movement downwards), initially in the second direction of movement 10 as far as a third loading level 11 and then in the second direction of movement 10 to the lowest position, where the container carrier 2 is moved by means of the horizontally operating third conveyor 12 (FIGS. 2 and 4) in the second return level 13. This movement is shown by the arrows 14 pointing towards the left in FIG. 1, which indicate a third direction of movement, which runs in the direction opposite to the first direction of movement, but parallel to the latter. If the container carrier 2 after completing the second return level 13 has arrived at the end of the conveyor at the bottom left, it is changed over onto the fourth lifting conveyor 15 (FIG. 3), which operates vertically upwards in the direction of the arrows 16 and 16', which is the fourth direction of movement. This vertical lifting of the fourth lifting conveyor 15 takes place in two steps. The first step is represented by the lower arrow 16 and reaches as far as the third loading level 11, after which the second half of the fourth direction of movement 16' is connected, until the container carrier 2 has arrived on the level of the first process level 7 and is there changed over in order to begin the intermittent movement in the first direction of movement 8.

Figure 2:
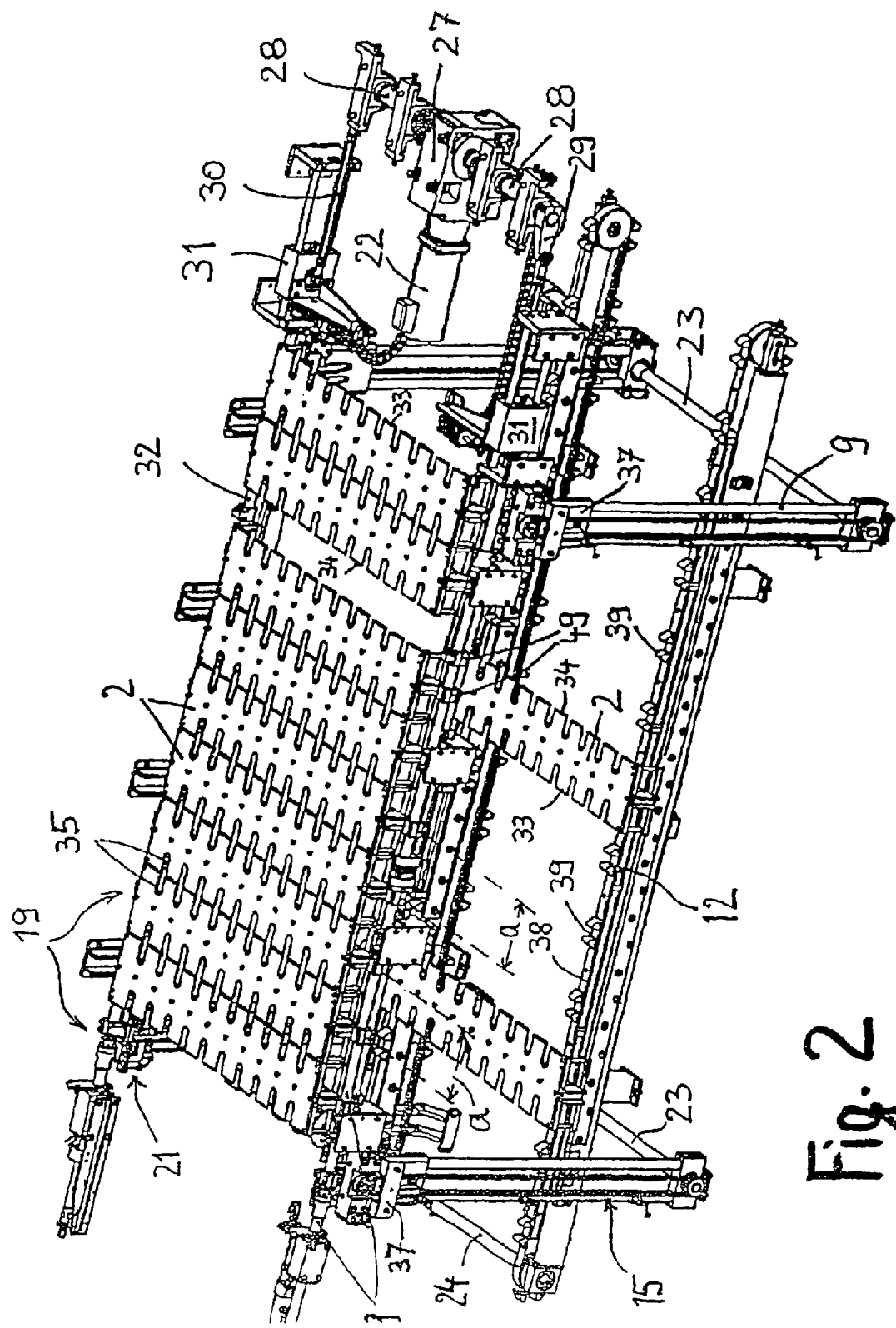

Therefore, according to FIGS. 1 and 2, there is a conveyance circuit which is rectangular, seen from the side, with a horizontal first direction of movement 8, to which the vertical second direction of movement 10 and 10' is connected to the right-hand outlet end, with the third direction of movement 14 from the right-hand lower end, to the left-hand lower end, and from there in the fourth direction of movement 16,16' upwards back to the first process level 7.

Furthermore, FIG. 1 shows three broken lines running parallel to each other, which represent the first process level 7, the second return level 13 and the third loading level 11. Above/below the second lifting conveyor 9 and also above/below the fourth lifting conveyor 15 there are superjacent ends 17/18 and 20/21. 17 is the upper end between the first conveyor 19 operating horizontally and operating along the first direction of movement in the first process level 7, and the second lifting conveyor 9. The lower end 18 is the end of the second lifting conveyor 9 and the beginning of the third conveyor 12, which operates horizontally in the third direction of movement 14. The latter ends in the lower end 20 of the fourth lifting conveyor 15. The fourth lifting conveyor 15 operating vertically and upwards finally returns the container carrier 2 to the first process level 7, at the upper end 21 of the fourth lifting conveyor.

Corresponding to the directions of movement there are also the four conveyors driven separately from each other, namely the first conveyor 19 running horizontally, the second lifting conveyor running vertically, the third conveyor 12 running horizontally, and the fourth lifting conveyor 15, also operating vertically.

The first conveyor 19 has the front end 21 and the rear end 17. The front end 21 lies above the lower end 20 of the fourth lifting conveyor 15, whilst the end 17 of the first conveyor 19 lies above the lower end 18 of the second lifting conveyor 15. Clearly, the ends 17 and 18 on the one hand and 21 and 20 on the other hand lie one above the other. The first conveyor 19 has a motor 22 as a separate drive. Both the lifting conveyor 9 and the lifting conveyor 15 each have a separate motor, which in FIG. 2 is attached to the rear conveyor in each case and cannot therefore be seen. Its torque is transmitted via the drive shafts 23. The horizontally operating third conveyor 12 in the second return level 13 is also driven via a separate motor which, in FIG. 2, can be envisaged at the left-hand lower and rear end, and is therefore not represented. Its torque is transmitted via the drive shaft 24 to the horizontal conveyor lines 12.

Not only does the third loading level 11 run parallel to the first process level 7, but also the loading directions represented by the arrows 25, 25' and 26, 26'. The means for loading and unloading are not represented in the drawings. However, slides attached to rods oscillating backwards and forwards can easily be imagined, with which a whole row of bottles is moved simultaneously to unload in the directions 25 to the right and left, and to load in direction 26 from the right and from the left into the center.

During operation of the conveyor, movement of the container carrier 2 runs approximately according to the representation in FIGS. 1 and 2, in such a way that most of the container carriers 2 are situated in the first process level 7 and only one or two container carriers are situated, for example, in the return section. The motor 22 (FIG. 2) drives, via a gear unit 27 from the center outwards to both sides, a shaft 28 in each case, so that on each side a backward and forward oscillating movement of a carriage 31 is produced via an oscillating lever 29 and a connecting rod 30, in order to move a push rod 32 on each side in the first direction of movement 8, and conversely, in the opposite direction of movement. This provides the intermittent movement of the individual container carriers 2 one stroke-length at a time, in particular during the movement from one processing station 4 to the next, etc., as far as the filling station 6. From there on, a two-step movement to the sealing station 5 takes place, as will be described below.

Figure 3:
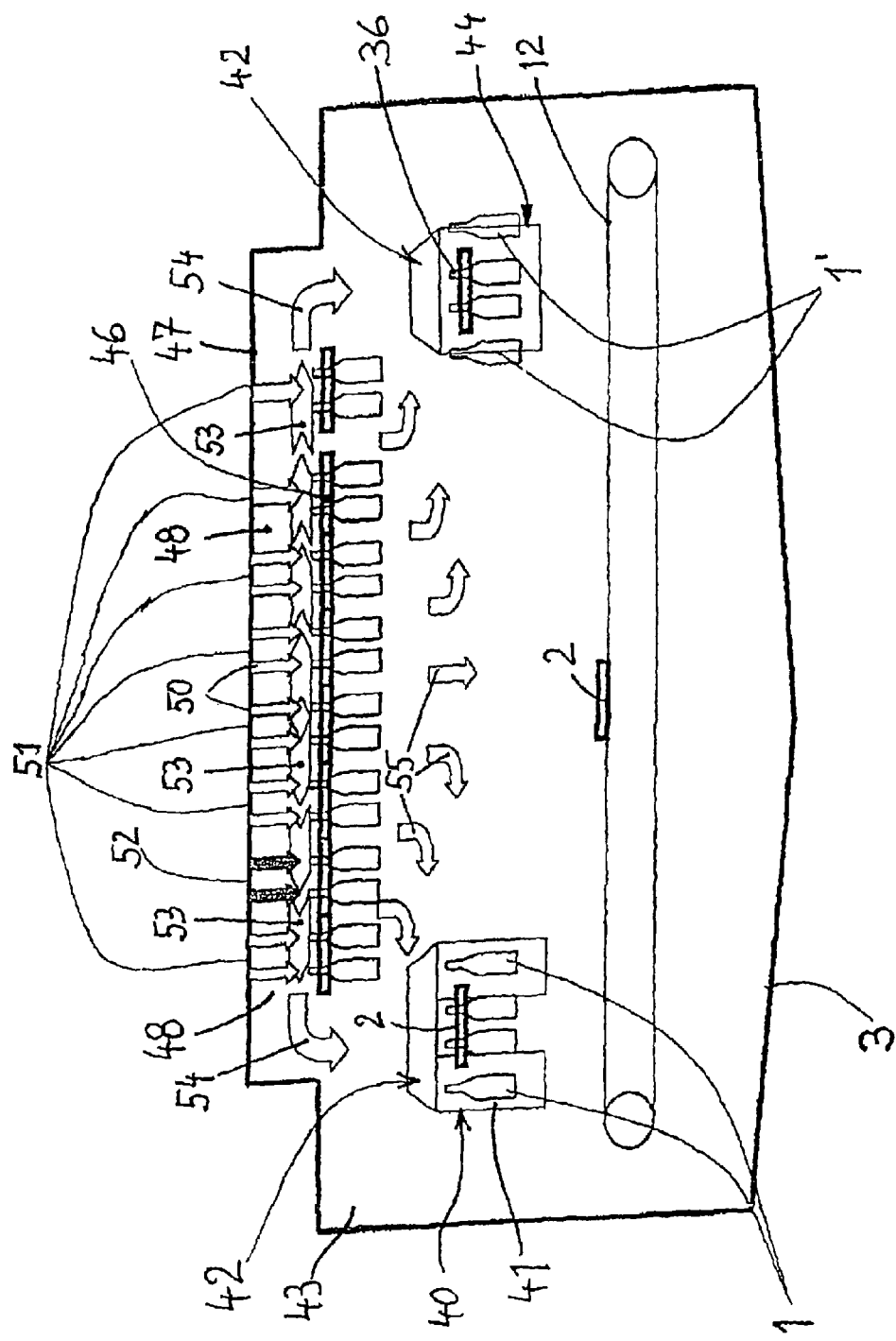

FIG. 3 shows the hygiene chamber 3, in the lower region of which the third conveyor 12 is situated. This moves a container carrier 2 straight to the left, below the bottle feed device generally designated 40. This consists of two tunnel-shaped spaces 41 arranged at a distance from one another, in which bottle-shaped containers 1 are shown. These bottles have been introduced straight through openings for containers to pass through that are not represented, in a direction opposite to the observer's direction of view of FIG. 3, into hygiene chamber 3. The container carrier arranged between the two tunnel-like spaces 41 must first be envisaged empty. Only after the bottles have been pushed into the container carrier 2 from the right and left sides by rake-like pushing devices out of holding strips which are not represented, are the bottles also held on the container carrier 2, as represented in FIG. 3. Then however, the bottles 1 in the tunnel-like spaces 41 would have to be envisaged as taken out. The gas extraction devices are generally designated 42. They are situated above the tunnel-like spaces 41 and extend in the observer's direction of view of FIG. 3, from the front to the rear, to the rear wall designated 43 of hygiene chamber 3. In this wall 43 are correspondingly constructed and dimensioned holes, through which the gases can be extracted into the space behind the hygiene chamber 3, and out of same.

A similar construction is also situated below the downstream end of the upper process level 7, namely on the side opposite the bottle feed device 40. Here, the bottle removal device is generally designated 44. Similarly to the bottle feed device 40, it consists of tunnel-like spaces, wherein sterile-filled and sealed bottles 1' are situated. Above this, a gas extraction device 42 is again fitted.

It can be envisaged that the lifting devices not represented in FIGS. 3 and 4 move the container carriers 2 from below to above/from above to below, resulting in both figures, in the line represented above of moveable container carriers 2 arranged one behind the other, and adjacent to each other. The L-shaped black arrow represented at the top left, which points to the right, shows the movement track 45 of the container carrier 2, which is just being changed over from the lifting conveyor into the process level 7. The line of adjacent container carriers 2 results in the predominantly closed field 46 of container carriers 2. Between this and the upper wall 47, arranged at a distance and parallel to this, of the hygiene chamber 3, is situated the "upper space" 48. This extends from the inlet end by the arrow 45 to the outlet end at the other L shaped arrow 50', which points downwards and shows how the last container carrier 2 is moved downwards into the middle, loading level.

In FIG. 3, in the upper wall 47 of the hygiene chamber 3, a plurality of openings as inlets 50 for sterilizing medium are to be envisaged. The many white arrows show the entry of sterile air from a source 52 of sterile air. The two dark arrows signify the supply of sterilization agent from a source 53. Both the sterilization agent from the source 52 and the sterile air from the source 51, i.e., in total the (mixed) sterilizing medium flows into the upper space 48 of the hygiene chamber 3 (in FIG. 3, vertically from top to bottom) and is turned around through the predominantly closed field 46 of the container carriers 2, so that it flows essentially parallel to the conveyance direction (first direction of movement 8) of the container carriers 2. This flow of the sterilizing medium is represented in FIG. 3 by the horizontal arrows 53 and the bent arrows 54 shown at the ends of the closed field 46. Smaller quantities of sterilizing medium also pass through the holes and gaps in the container carriers 2, i.e., through the closed field 46, and are shown in the form of the lower arrows 55 as the flow of the sterilizing medium. It can be seen how the sterilizing medium, after leaving the upper space 48, is gradually drawn to the gas extraction devices 42.

Figure 4:
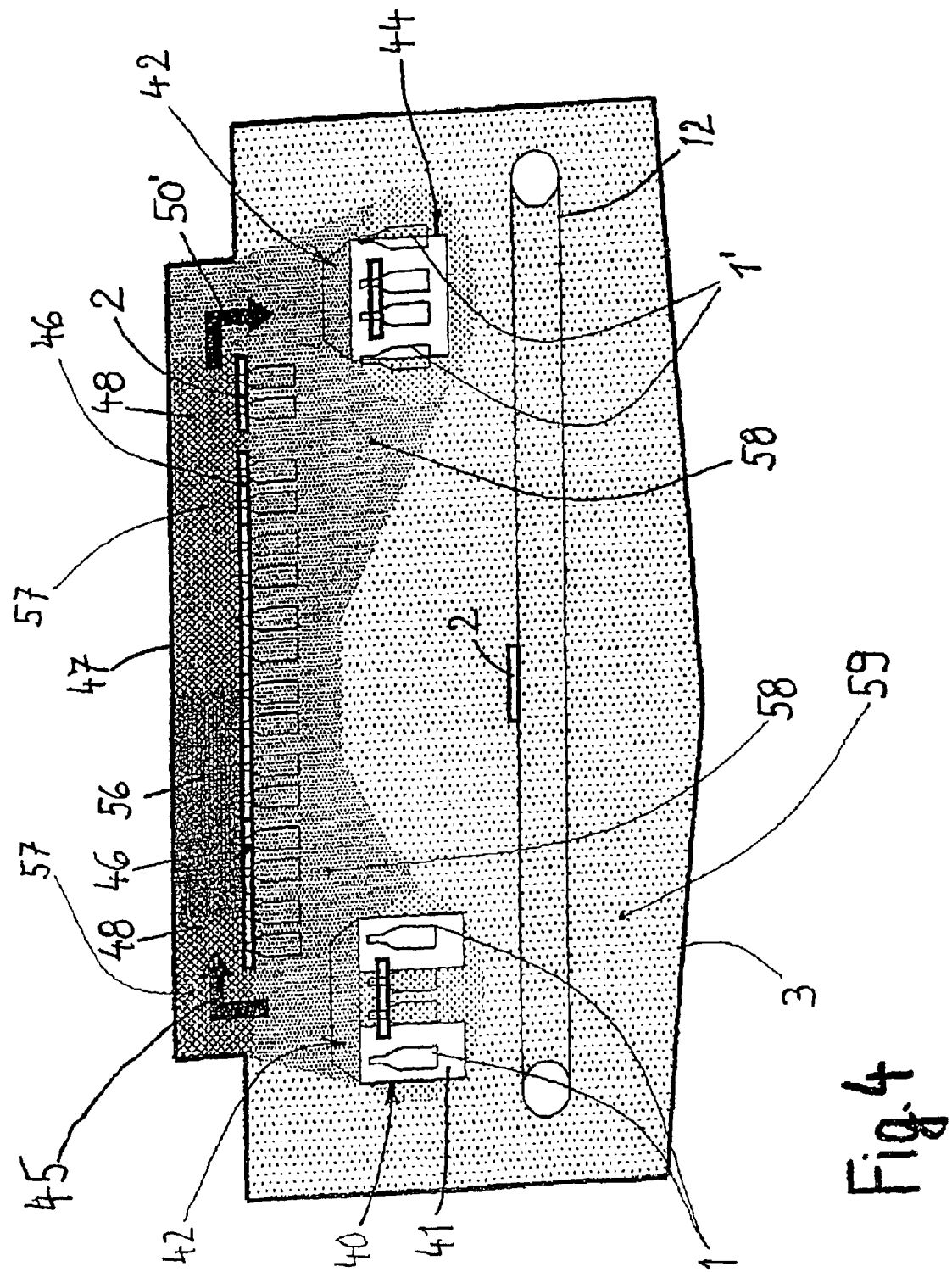

Through the flows of the sterilizing medium described and represented in FIG. 3, which is mixed with sterilization agent, for example $H_2O_2$, different areas are produced with varying concentrations of sterilization agent in the sterilizing medium, as shown in FIG. 4. The inside of the hygiene chamber 3 is filled throughout with sterilizing medium, in which the concentration of sterilization agent however varies. Directly next to the inlet 50 for sterilizing medium, through which sterilization agent enters from the source 52 (two dark arrows), a region 56 develops of the highest concentration of sterilization agent within the sterilizing medium in the upper space 48. Downstream and upstream of this region 56, due to the inflow of sterile air through the plurality of openings from the source 51 of sterile air, regions 57 develop of high concentration of the sterilization agent in the sterilizing medium. Next to and below the closed field 46 of the container carriers 2, a region 58 consequently develops of average concentration of the sterilization agent in the sterilizing medium. In the remaining parts of the hygiene chamber 3, the region 59 develops of low concentration of the sterilization agent in the sterilizing medium. The different regions 56–59 are characterized by shades of grey in FIG. 4 of varying intensity.

In the bottle feed device 40 and in the bottle removal device 44, the white fields in the tunnel-like spaces 41 show the absence of sterilization agent (areas of minimum concentration).

In the preferred embodiment represented here, each container carrier 2 has the form of an elongated strip extending at right angles to the first direction of movement 8, and the form of a sheet. From the front side 33 (FIG. 5) of the container carrier 2 extend U-shaped recesses 35 that are open outwards towards this side 33. Also, from the diametrically opposite rear side 34 of the container carrier 2 extend—however in the opposite direction to the recesses on the front side 33—a row of recesses 35 that are open towards the rear. As the containers 1 here are bottles with a neck 36 arranged at their opening, the width B (FIG. 5) is matched to the external diameter D (FIG. 5), so that the bottle with its neck 36, which for example has an external thread, can be introduced into the recess 35 and held there. This hold is independent of the design of the bottle in the lower region, be it long, round, angular, short, large or small. The second lifting conveyor 9 and the fourth lifting conveyor 15 operate with vertically driven slides 37, which engage on both sides with the respective container carriers 2 and lower these from the first process level 7 into the second return level 13 (lifting conveyor 9) or vice versa (lifting conveyor 15). The third, horizontally operating conveyor 12 operates with a continuous belt 38 on which pockets 39 are fitted, into which the container carriers 2 are vertically pushed.

On each push rod 32, feed cams 49 are attached at distances a (FIG. 2) radially projecting at a specific angle from the push rod 32. This distance a is equal to the average distance between two container carriers 2 moved adjacent to each other. As a result, the push rods 32 can be driven oscillating via locking grooves that are not described in more detail.

Figure 5:
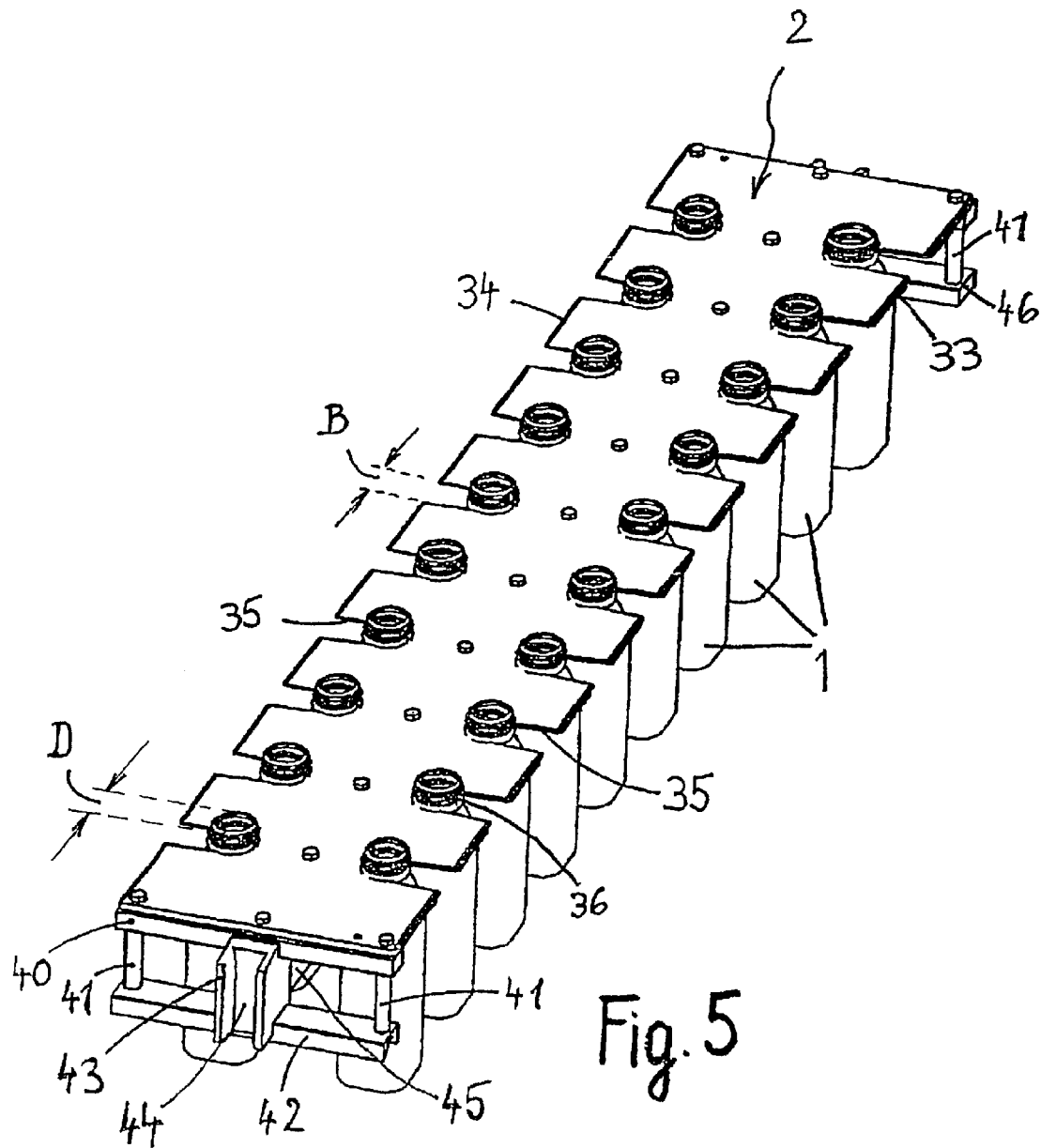

During operation of the new filling device, the bottles 1 are introduced through the rear wall 43 of the hygiene chamber 3 opposite to the observer's direction of view of FIGS. 3 and 4 on a holding rail, on which as many bottles 1 hang as can then be introduced into the container carrier 2 (FIG. 5). Due to the shape of the entrance openings matched to the bottle contour in the rear wall 43 to the bottle feed device 40, most of the contaminated ambient air is already retained, but a certain proportion still flows into the tunnel-like space 41 and is there removed via the gas extraction device 42. Also, the volume inside the bottle is subject to extraction and is gradually removed and replaced by the gases from hygiene chamber 3. After loading the container carrier 2, the outer tunnel-like spaces 41 are empty, so that the container carrier 2 can be conveyed through the space which is empty towards the top, from the loading level 11 upwards into the first process level 7, where it is changed over according to the movement track 45 (black arrow, FIG. 4) onto the horizontal conveyor. Here, the container carrier 2 connects to the existing line of container carriers, resulting in the closed field 46 of the container carriers 2, as shown in FIGS. 1 to 4. The bottle openings have in the meantime been moved through the region 58 of average concentration into the region 57 of high concentration, and now move in their first direction of movement 8 (from left to right in FIGS. 1 to 4) under the openings of the inlet 50 for sterilizing medium. In the sterilization region, and subsequently the drying region, the bottles arrive in the region 56 of highest concentration, and after drying of the sprayed-in sterilization agent, are to be regarded as bacteria-free and sterile. They are then conveyed for further processes, such as, for example, filling and sealing, onwards to the right into a region 57 of high concentration and arrive at the downstream end of the closed field 46 to be transferred into the lifting conveyor, according to the right-hand, L-shaped black arrow 50' in FIG. 4.

The container carrier 2 with the treated, sterile-filled and sealed bottles 1 is conveyed downwards into the third loading level 11. Pushing devices are situated there, which are similar to those in the region of the bottle feed device 40, which however here, in the bottle removal device 44, remove the treated bottles from the bottle carrier or container carrier 2 sideways outwards into the position 1'. From there the bottles 1' thus transferred can be guided, in the observer's direction of view of FIGS. 3 and 4, out of the hygiene chamber and transferred to other conveyor belts.

List of Reference Numbers

1 Container, bottle
2 Container carrier
3 Hygiene chamber
4,5,6 Processing stations
5 Sealing station
6 Filling station
7 First process level
8 First direction of movement (conveyance direction)
9 Second lifting conveyor
10,10' Second direction of movement
11 Third loading level
12 Third conveyor
13 Second return level
14 Third direction of movement
15 Fourth lifting conveyor
16,16' Fourth direction of movement
17 Upper end of second lifting conveyor 9
18 Lower end of second lifting conveyor 9
19 First conveyor
20 Lower end of the fourth lifting conveyor 15
21 Upper end of the fourth lifting conveyor 15
22 Motor, drive
23,24 Drive shafts
25,25' Loading direction (unloading)
26,26' Loading direction (loading)
27 Gears
28 Shaft
29 Oscillating lever
30 Connecting rod
31 Carriage
32 Push rod
33 Front side of the container carrier
34 Rear side of the container carrier
35 Recess
36 Neck of a bottle
37 Carriage
38 Continuous belt
39 Pocket
40 Bottle feed device
41 Tunnel-shaped space
42 Gas extraction device
43 Rear wall of the hygiene chamber 44
44 Bottle removal device
45 Movement direction of the container carrier 2
46 Closed field of the container carriers 2
47 Upper wall of the hygiene chamber 3
48 Upper space
49 Feed cam
50 Inlet for sterilizing medium
50' Right arrow for movement track of the container carriers 2
51 Source of sterile air
52 Source of sterilization agent
53 Flow of the sterilizing medium (horizontal, straight arrows)
54 Flow of the sterilizing medium (bent arrows)
55 Flow of the sterilizing medium (lower arrows)
56 Region of highest concentration of sterilization agent in the sterilizing medium
57 Region of high concentration of sterilization agent in the sterilizing medium 58 Region of average concentration of sterilization agent in the sterilizing medium
59 Region of low concentration of sterilization agent in the sterilizing medium
a Distance between feed cams
B Width of recesses 35
D External diameter of the neck of the bottle

I claim:

1. A device for sterile filling of containers, which comprises
   (i) a hygienic chamber having at least an upper zone and a lower zone;
   (ii) a conveyor system housed in said hygienic chamber comprising a plurality of container carriers for holding a multiplicity of containers and means for transporting said container carriers and containers through a conveyance circuit having a plurality of horizontally spaced processing levels,
   (iii) means for introducing sterilizing agent into said upper zone of said hygienic chamber, wherein said multiplicity of containers are at least sterilized, and
   (iv) means for maintaining said container carriers in close proximity to one another to form a predominantly closed field when said container carriers are in said upper zone of said chamber for maintaining the highest concentration of said sterilizing agent in said upper zone, said conveyor system and hygienic chamber adapted for a reduction in the concentration of sterilizing agent in said hygienic chamber as said agent descends through said plurality of horizontally spaced processing levels of said conveyance circuit.

2. The device according to claim 1, wherein said hygienic chamber is defined at least in part by an upper wall, and said container carriers in said upper zone with said upper wall providing a head space for guiding the distribution of sterilizing agent in said head space and for maximizing contact with said containers.

3. The device according to claim 2, wherein said head space is adapted for conveying said sterilizing agent in a direction substantially parallel with the direction of conveyance of said container carriers.

4. The device according to claim 2, wherein the conveyor system further comprises vertically operating conveyor means for transmission of container carriers between said plurality of horizontally spaced processing levels.

5. The device according to claim 1, wherein the container carriers enter said predominantly closed field through dynamic locks comprising openings in said hygienic chamber for containers to enter, including means for moving and mounting said containers on said container carriers, and for extraction of gases introduced with said containers.

6. The device according to claim 1, wherein most of the container carriers in said upper zone are in juxtaposition with one another.

7. The device according to claim 1, wherein said conveyance circuit is of a rectangular configuration, and comprises at least three processing levels in said hygienic chamber, an upper first processing level, a lower container carrier return level and an intermediate level for loading empty containers and unloading filled and sealed containers from said container carriers.

8. The device of claim 7, wherein said upper first processing level is in said upper zone of said hygienic chamber, said first processing level further comprising means for filling and sealing sterilized containers.

9. The device of claim 1, wherein said container carriers comprise generally U-shaped recesses arranged on opposite sides of said carriers for engaging with necks of bottle shaped containers.

10. A method for sterile filling of containers, which comprises the steps of:
   (i) providing a hygienic chamber having at least an upper zone and a lower zone and a plurality of horizontally spaced processing levels in said upper and lower zones;
   (ii) introducing a plurality of empty containers into a first processing level in said upper zone for transporting through a conveyance circuit in said chamber, said containers positioned in close proximity to one another in said first processing level to form a predominantly closed field with a wall of said chamber;
   (iii) introducing a sterilizing agent into said predominantly closed field to maintain the highest concentration of sterilizing agent in said upper zone in contact with said containers and a reduction in concentration of sterilizing agent in said hygienic chamber as said agent descends through said plurality of spaced processing levels;
   (iv) transporting said sterilized containers to a filling station and a sealing station for filling and sealing said sterilized containers, and
   (v) discharging said filled and sealed containers from said hygienic chamber.

11. The method according to claim 10, including the step of loading empty containers onto the conveyance circuit at a loading station for transporting to said predominantly closed field.

12. The method according to claim 11, including the steps of introducing said containers into said closed field through openings, extracting gases introduced with said empty containers, and for transporting through said conveyance circuit.

13. The method according to claim 11 wherein said empty containers are arranged on multiple container carriers, said carriers in juxtaposition with one another in said first processing level.

14. The method according to claim 13, wherein said conveyance circuit is of a rectangular shaped configuration comprising at least three horizontally spaced processing levels, an upper first processing level wherein said empty containers are sterilized, filled and sealed, an intermediate level wherein said filled containers from the first processing level are unloaded, and a lower level wherein said empty carriers are returned to said intermediate processing level for loading said container carriers with empty containers.

15. The method according to claim 10, including the step of filling empty containers in said first processing level with nitrogen.

16. The method according to claim 10, wherein the containers are filled with a liquid foodstuff.

17. The method according to claim 10, wherein said conveyance circuit is rectangularly shaped.

18. The method of claim 14, wherein said empty carriers in the lower processing level are spaced apart from one another in returning to said intermediate processing level.

* * * * *